March 31, 1936.   E. A. CROSS   2,035,867
TRACTOR
Filed Nov. 28, 1934
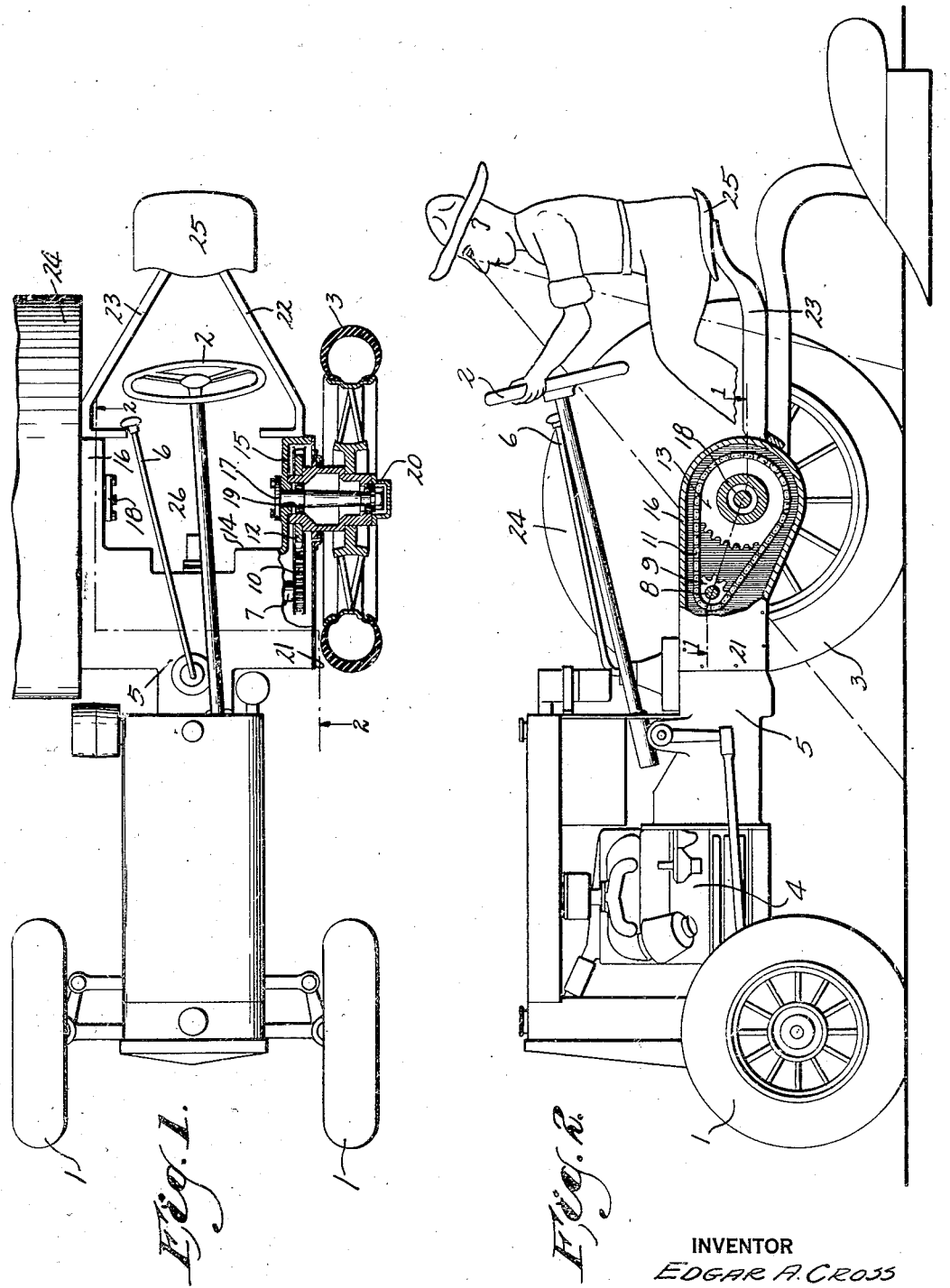
INVENTOR
*EDGAR A. CROSS*
BY
*Fred G. Parsons*
ATTORNEY Patented Mar. 31, 1936

2,035,867

UNITED STATES PATENT OFFICE 2,035,867

TRACTOR

Edgar A. Cross, Greenwich, Ohio, assignor to Centaur Tractor Corporation, Greenwich, Ohio Application November 28, 1934, Serial No. 755,115

9 Claims. (Cl. 180—54)

This invention relates to tractors, and more particularly to an improved type of tractor having greater operating convenience for such work as plowing, cultivating, etc.

A purpose is to provide a tractor in which the relationship of the various parts is such as to provide greatly increased visibility for the ground surface immediately adjacent to and in front of the operator.

Another purpose is to provide a tractor having an improved arrangement of motive parts, driving parts, control parts, and operator's seat, with respect to the farm tools, such as a cultivator or plow, which are intended to be operated by the tractor.

A further purpose is to provide a tractor structure effecting a relative position of the operator, such that the operator has a substantially clear field of vision for the ground surface adjacent to and in front of the farm tool which is being operated by the tractor.

A still further purpose is to simplify and improve the construction and operation of tractors, and still other purposes will be apparent.

The invention consists in the construction herein illustrated and described, together with such modifications thereof as are equivalent to the structure claimed. The same reference characters have been applied to indicate the same structures throughout.

In the drawing:

Figure 1 is a top or plan view, partly in section, along line 1—1 of Figure 2, of a tractor incorporating my invention.

Figure 2 is a side view of the same tractor, partly in section along lines 2—2 of Figure 1, and showing the relative position of the tractor, the operator, and a plow operatively coupled to the tractor.

The tractor includes front wheels 1, which are connected with a steering wheel 2 in any suitable manner, and rear or driving wheels 3, 3. An internal combustion engine 4 is supported at the front end of the tractor and may drive the rear wheels 3, 3 through any suitable clutch and speed change mechanism (not shown), housed in a casing or housing 5, and controlled by an operating lever 6. Casing 5 forms a frame extended rearwardly to contain a suitable type of differential mechanism (not shown) connected to be driven from the engine 4 through the clutch and speed change mechanism and connected to drive the shafts 7, 8, which are connected to drive the different rear wheels through sprocket pinions such as 9, chains 10, 11, and sprocket gears 12, 13, which are fixed on the hubs of the different wheels.

The engine, transmission, and differential are positioned relatively far forward of the machine, whereby the rear wall 14 of the casing 5 may stand considerably forward of the axis of the rear wheels, as shown in Figure 1.

The casing 5 provides a frame which is extended rearwardly, being bifurcated to provide side portions as at 15, 16, a wide central portion being kept vertically open as at 26. Fixed on the rear extensions of the frame are the axles 17, 18, upon which the wheel hubs are carried, there being anti-friction wheel bearings such as 19, 20 carrying the axial thrust and radial load of the wheels.

The rearward extending casing portions 15, 16 also provide housings for the sprocket and chains and have removable cover portions such as 21 to permit of access to these parts. The portions 15, 16 also carry the seat supports 22, 23 and carry wheel guards such as 24.

The operator's seat 25, fixed on the supports 22, 23, which are bolted or otherwise fixed on the frame, is relatively far to the rear of the axis of the rear wheels and also relatively low, being but little above the level of the bottom of casing 5. Partly by reason of this position of the seat and partly by reason of the structure which provides the open space 26, the operator has a substantially clear view of a considerable area of the ground surface behind the engine and ahead of the seat, and ahead of the plow or other tool which the tractor is pulling.

With the construction disclosed, the operator can readily view the ground portion ahead of the farm tool being operated by the tractor, as indicated in Figure 2, and in ample time to stop the tractor or raise the tool in the event that there are any obstructions, such as semi-hidden stones or stumps, which might otherwise damage the tool. Clear downward vision at this point is also of great advantage where it is necessary to guide the tractor to follow the rows of growing crops, as when cultivating, and for other purposes.

I claim:

1. A tractor having wheels, including a plurality of rear wheels axially spaced apart, a frame carried by said wheels, an engine supported on said frame, and an operator's seat supported on said frame adjacent said rear wheels and behind said engine, said frame being rearwardly centrally bifurcated to provide a downwardly substantially open space of substantial horizontal area and positioned longitudinally between said seat and engine and laterally substantially centrally between said rear wheels for downward vision of an operator seated in said seat, said seat being at a low level relative to the lower rear central portion of said frame, whereby to provide said downward vision over a ground area extended substantially forward of said frame portion.

2. A tractor having wheels including a plurality of rear wheels axially spaced apart, a frame carried by said wheels, an engine supported from said frame, and an operator's seat supported on said frame rearwardly of said engine and positioned at a height approximately corresponding to that of the axis of said rear wheels, said frame having rear side portions spaced apart behind said engine and ahead of said seat to provide a space between said frame portions and of substantial horizontal area for downward vision for an operator seated in said seat.

3. A tractor having supporting and driving elements including a plurality of elements laterally spaced apart and respectively engageable with ground surfaces adjacent opposite sides of the rear portion of said tractor, a frame carried by said elements, a power unit supported from said frame, and an operator's seat supported on said frame rearwardly of said power unit, said frame having rear side portions spaced apart and extended rearwardly to provide a downwardly open vision space between said frame portions and of substantial horizontal area between said ground surfaces ahead of said operator's seat and behind said engine, said seat being at a low level relative to the lower rear central frame portion whereby to provide said downward vision over a ground area extended substantially forward of said frame portion.

4. In a tractor having wheels including rear wheels axially spaced apart, the combination of a frame carried by said wheels, an engine supported on said frame from said frame, an operator's seat supported rearwardly of said engine and at a relatively low level, said frame having rear side portions spaced apart behind said engine and ahead of said seat to provide a space of substantial area for forward and downward vision between said portions, and a transmission including portions respectively individual to the different rear wheels and respectively carried by different of said frame portions.

5. In a tractor having wheels including rear wheels axially spaced apart, the combination of a frame carried by said wheels, an engine supported from said frame, an operator's seat supported on said frame rearwardly of said engine, said frame having rear side portions spaced apart behind said engine and ahead of said seat to provide a space of substantial area for downward vision, and a plurality of axles respectively for different of said rear wheels and respectively carried by different of said side portions.

6. In a tractor having wheels including rear wheels axially spaced apart, the combination of a frame carried by said wheels, an engine supported from said frame, an operator's seat supported on said frame rearwardly of said engine, said frame having rear side portions spaced apart behind said engine and ahead of said seat to provide a space of substantial area for downward vision, a plurality of axles respectively carried by different of said frame portions for the different rear wheels, and a transmission including a plurality of sprocket and chain connections respectively connected to the different rear wheels, said frame portions being of a form providing housings for protecting said sprocket and chain connections.

7. In a tractor having a plurality of axially spaced front wheels and a plurality of axially spaced rear wheels, the combination of an engine carried by said wheels at a position closely adjacent to the axis of said front wheels, a transmission housing extending rearwardly of said engine and bifurcated at the rear to provide side portions laterally spaced apart, said rear wheels being hung from said housing rearwardly of the point of bifurcation thereof, and an operator's seat supported on said frame in a position substantially back of said point of bifurcation to provide a substantial area of vision of the ground underneath said tractor downwardly between said side portions and behind said engine for an operator seated in said seat.

8. In a tractor having a plurality of axially spaced front wheels and a plurality of axially spaced rear wheels, the combination of an engine carried by said wheels in a position closely adjacent to the axis of said front wheels, a transmission housing extending rearwardly of said engine and bifurcated at the rear to provide side portions laterally spaced apart, said rear wheels being hung from said housing rearwardly of the point of bifurcation thereof, an operator's seat supported on said frame in a position substantially back of said point of bifurcation to provide a substantial area of vision of the ground underneath said tractor downwardly between said side portions and behind said engine for an operator seated in said seat, and a transmission including portions carried by said side portions for the different rear wheels and respectively within the different side portions to be protected thereby.

9. In a tractor having a plurality of axially spaced front wheels and a plurality of axially spaced rear wheels, the combination of an engine carried by said wheels in a position closely adjacent to the axis of said front wheels, a transmission housing extending rearwardly of said engine and bifurcated at the rear to provide side portions laterally spaced apart, said rear wheels being hung from said housing rearwardly of the point of bifurcation thereof, an operator's seat supported on said frame in a position substantially back of said point of bifurcation to provide a substantial area of vision of ground underneath said tractor downwardly between said side portions and behind said engine for an operator seated in said seat, and a transmission including a plurality of chain and sprocket connections respectively for the different rear wheels and respectively housed by the different side portions.

EDGAR A. CROSS.